United States Patent
Ambekar et al.

(10) Patent No.: US 8,164,860 B1
(45) Date of Patent: Apr. 24, 2012

(54) SERVO WRITE ROBUST AND GOOD ALTITUDE PERFORMANCE ABS

(75) Inventors: Rohit P. Ambekar, Sunnyvale, CA (US); Nghia Bach, San Jose, CA (US); Remmelt Pit, Menlo Park, CA (US); Oscar J. Ruiz, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 7 days.

(21) Appl. No.: 12/908,789

(22) Filed: Oct. 20, 2010

(51) Int. Cl.
*G11B 5/60* (2006.01)
(52) U.S. Cl. .................................. 360/236.2
(58) Field of Classification Search ............... 360/236.2
See application file for complete search history.

(56) References Cited

U.S. PATENT DOCUMENTS

| | | | |
|---|---|---|---|
| 5,309,303 A | 5/1994 | Hsia et al. | |
| 5,396,386 A | 3/1995 | Bolasna et al. | |
| 5,490,026 A | 2/1996 | Dorius et al. | |
| 5,798,889 A | 8/1998 | Dorius et al. | |
| 5,825,587 A | 10/1998 | Bolasna et al. | |
| 6,515,831 B1 * | 2/2003 | Sannino et al. | 360/235.6 |
| 6,556,381 B2 | 4/2003 | Kohira et al. | |
| 6,594,113 B2 * | 7/2003 | Rao et al. | 360/235.8 |
| 6,922,313 B1 | 7/2005 | Gitis et al. | |
| 6,982,851 B2 | 1/2006 | Yamamoto et al. | |
| 7,099,114 B2 | 8/2006 | Kang | |
| 7,123,449 B2 | 10/2006 | Kang | |
| 7,262,937 B2 * | 8/2007 | Pendray et al. | 360/235.1 |
| 7,333,297 B2 | 2/2008 | Park | |
| 7,339,765 B2 | 3/2008 | Takagi | |
| 7,505,228 B2 * | 3/2009 | Hanyu | 360/235.6 |
| 7,564,650 B2 * | 7/2009 | Kajitani | 360/235.5 |
| 7,593,473 B2 | 9/2009 | Learned et al. | |
| 7,616,405 B2 * | 11/2009 | Hu et al. | 360/236.2 |
| 7,679,863 B2 | 3/2010 | Hashimoto et al. | |
| 7,719,794 B2 * | 5/2010 | Hanyu et al. | 360/235.6 |
| 2003/0039073 A1 * | 2/2003 | Rao | 360/235.8 |
| 2004/0012887 A1 * | 1/2004 | Rajakumar et al. | 360/236.2 |
| 2005/0280943 A1 * | 12/2005 | Inoue et al. | 360/236.2 |
| 2007/0019329 A1 | 1/2007 | Yao et al. | |
| 2007/0025023 A1 | 2/2007 | Kohira et al. | |
| 2007/0047145 A1 * | 3/2007 | Matsumoto | 360/236.2 |
| 2007/0188925 A1 * | 8/2007 | Ishihara | 360/235.8 |

OTHER PUBLICATIONS

Kojima et al. "Flying characteristics of a novel negative pressure slider "Papillon"," Journal of Applied Physics, 1997, vol. 81, Issue 8, pp. 5399-5401, American Institute of Physics.
Li et al. "Interface solution for writing-induced nano-deformation of slider body," Journal of Magnetism and Magnetic Materials, vol. 303, Issue 2, Aug. 2006, pp. e86-e90.
Tominaga et al. "A circular arc slider with a high flying height supported by parallel flat springs for optical disc devices," Microsystem Techologies, vol. 13, Issue 8-10, Apr. 2007, pp. 1131-1139.

* cited by examiner

*Primary Examiner* — Mark Blouin
(74) *Attorney, Agent, or Firm* — Patterson & Sheridan, LLP (57) ABSTRACT

A head slider for a disk drive storage device. In general, the head slider should fly at the target height above the disk without crashing onto the hard disk. The head slider has an outside flange that encloses a plateau and an inside flange that encloses a plateau. The two plateaus may have the same surface area or the outside plateau may have a greater surface area. Because of the design of the outside flange, the likelihood that the head slider will crash on the hard disk is reduced.

20 Claims, 6 Drawing Sheets

SERVO WRITE ROBUST AND GOOD ALTITUDE PERFORMANCE ABS

BACKGROUND OF THE INVENTION

1. Field of the Invention

Embodiments of the present invention generally relate to a head slider within disk drive storage devices.

2. Description of the Related Art

Hard disk drives are used in many computer system operations. In fact, many computing systems operate with some type of hard disk drive to store the most basic computing information, e.g., the boot operation, the operating system, the applications, etc. In general, the hard disk drive is a device, which may or may not be removable, but without which, some computing systems may not operate.

A typical hard disk drive includes a storage disk or hard disk that spins at a standard rotational speed. An actuator arm or slider is utilized to reach out over the disk. The arm has a magnetic read/write transducer or head for reading/writing information to or from a location on the disk. The complete assembly, e.g., the arm and head, is called a head gimbal assembly (HGA). The assembly consisting of the disks, HGAs, spindle, housing, and the other parts internal to the housing is called the head disk assembly, or HDA.

In operation, the hard disk is rotated at a set speed via a spindle motor assembly having a central drive hub. Additionally, there are channels or tracks spaced at known intervals across the disk. Most current embodiments arrange the signal regions in concentric circular tracks, but other designs, such as spirals or irregular closed or open paths, are possible and useful. When a request for a read of a specific portion or track is received, the hard disk aligns the head, via the arm, over the specific track location and the head reads the information from the disk. In the same manner, when a request for a write of a specific portion or track is received, the hard disk aligns the head, via the arm, over the specific track location and the head writes the information to the disk. Refinements of the disk and the head have provided reductions in the size of the hard disk drive.

The ever increasing need for data storage has led some disk drive makers to steadily increase the amount of data stored on a drive. Mechanical considerations, radiated audible noise limits, power requirements, and other factors limit the number of disks that can be economically combined in a single drive. Thus, disk drive technology has generally focused on increasing the amount of data stored on each disk surface by positioning the heads more closely to the media surface. However, care must be taken to avoid unintended contact between the head components and the moving media surface.

Typically, the heads are lightly spring loaded, with the spring tension perpendicular to the media surface plane and directed against the media surface. An air bearing separates the head and media surfaces as follows. As the media moves relative to the head, air is dragged by the disk surface through specifically designed channels in the surface of the head adjacent to the media surface. The surface of the head and the channels contained therein, collectively referred to as the air-bearing surface (ABS), are designed to generate regions of increased and decreased air pressure in between the ABS and media surface that forces the head away from direct contact with the media surface, in effect causing the head to fly above the media surface. The separation of the head ABS and media surface, commonly called fly height, is a complex phenomenon primarily a function of gas viscosity and mean free path, the spring preload, the relative speed between the head and media surface, and the pattern of channels present on the head air bearing surface adjacent to the media surface. It is well known to those familiar with head-disk interface design that a particular head-disk combination will not fly precisely at the desired separation. Variances in mechanical and geometric tolerances, spring tensions, and other factors result in a nearly Gaussian statistical fly-height population distribution generally centered about the mean fly height. Furthermore, the head and its mounting gimbal are subject to mechanical tolerances and forces that can cause it to deviate from the desired attitude with respect to the media surface, (e.g., static and dynamic pitch and roll). This can move some areas of the air bearing surface closer or further from the media surface.

Therefore, there is a need in the art for a head slider design that is capable of maintaining a desired fly height without crashing onto the disk.

SUMMARY OF THE INVENTION

The present invention generally relates to a head slider within a disk drive storage device. In general, the head slider should fly at the target height above the disk without crashing onto the hard disk. The head slider discussed herein has an outside flange that encloses a plateau and an inside flange that encloses a plateau. The two plateaus may have the same surface area or the outside plateau may have a greater surface area. Because of the design of the flanges, the slider will fly at a stable fly height above the disk surface.

In one embodiment, a head slider for a hard disk drive is disclosed. The head slider includes a head body having a leading edge, a trailing edge, an outside edge, an inside edge, and an air bearing surface disposed on the head body. The air bearing surface has a leading portion extending across the leading edge between the outside edge and the inside edge and a tail portion spaced from the leading portion by a cavity that has a first depth relative to the air bearing surface. The tail portion has an outside flange surrounding a first plateau that is at a second depth that is less than the first depth, the first plateau having a first width. The tail portion also has an inside flange surrounding a second plateau that is at the second depth, the second plateau having a second width. The tail portion also has a trailing portion coupled between the outside flange and the inside flange. The trailing portion has a trailing pad, a first wall extending between the trailing pad and the outside flange to surround a third plateau that is at a third depth that is greater than the second depth and less than the first depth, and a second wall extending between the trailing pad and the inside flange to surround a fourth plateau at the third depth.

In another embodiment, a hard disk drive is disclosed. The hard disk drive includes a magnetic disk having a surface. The magnetic disk, when rotating, creates airflow in a direction substantially tangential to the magnetic disk. The hard disk drive also includes an actuator arm designed and configured to support a head slider over the disk surface at an inner diameter position, an outer diameter position, and positions between the inner diameter and outer diameter positions. The head slider includes a head body having a leading edge, a trailing edge, an outside edge, an inside edge, and an air bearing surface disposed on the head body. The air bearing surface has a leading portion extending across the leading edge between the outside edge and the inside edge and a tail portion spaced from the leading portion by a cavity that has a first depth. The tail portion has an outside flange surrounding a first plateau that is at a second depth that is less than the first depth, the first plateau having a first width. The tail portion also has an inside flange surrounding a second plateau that is at the second depth, the second plateau having a second width. The tail portion also has a trailing portion coupled between the outside flange and the inside flange. The trailing portion has a trailing pad, a first wall extending between the trailing pad and the outside flange to surround a third plateau that is at a third depth that is greater than the second depth and less than the first depth, and a second wall extending between the trailing pad and the inside flange to surround a fourth plateau at the third depth.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Figure 1A:
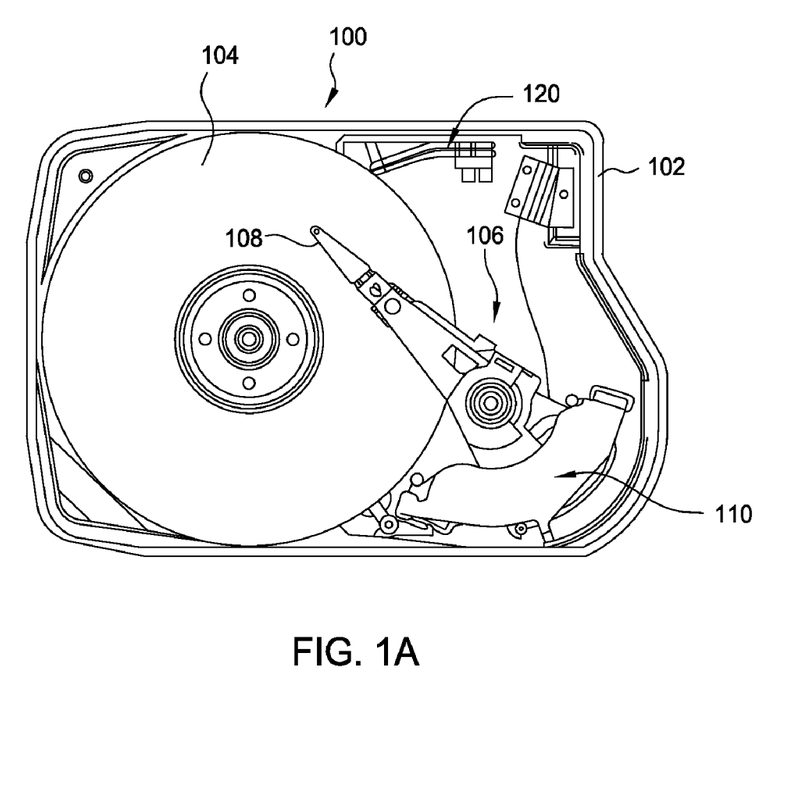
FIG. 1A is a schematic top view of a disk drive.

FIG. 1A shows one embodiment of a magnetic hard disk drive 100 that includes a housing 102 within which a magnetic disk 104 is fixed to a spindle motor (SPM) by a clamp. The SPM drives the magnetic disk 104 to spin at a certain speed. A head slider 108 accesses a recording area of the magnetic disk 104. The head slider 108 has a head element section and a slider to which the head element section is fixed. The head slider 108 is provided with a thermal fly-height control which adjusts the flying height of the head above the magnetic disk 104. An actuator 106 carries the head slider 108. In FIG. 1A, the actuator 106 is pivotally held by a pivot shaft, and is pivoted around the pivot shaft by the drive force of a voice coil motor (VCM) 110 as a drive mechanism. The actuator 106 is pivoted in a radial direction of the magnetic disk 104 to move the head slider 108 to a desired position. Due to the viscosity of air between the spinning magnetic disk 104 and the head slider's ABS facing the magnetic disk 104, a pressure acts on the head slider 108. The head slider 108 flies low above the magnetic disk 104 as a result of this pressure balancing between the air and the force applied by the actuator 106 toward the magnetic disk 104. In some embodiments, the head slider 108 may have raised areas or portions (such as pads) that actually contact disk 104, as opposed to the slider head "flying" over the disk 104. In some embodiments, the disk drive 100 may include a ramp 120, where the head slider 108 is parked when the disk drive 100 is not in operation and disk 104 is not rotating.

Figure 1B:
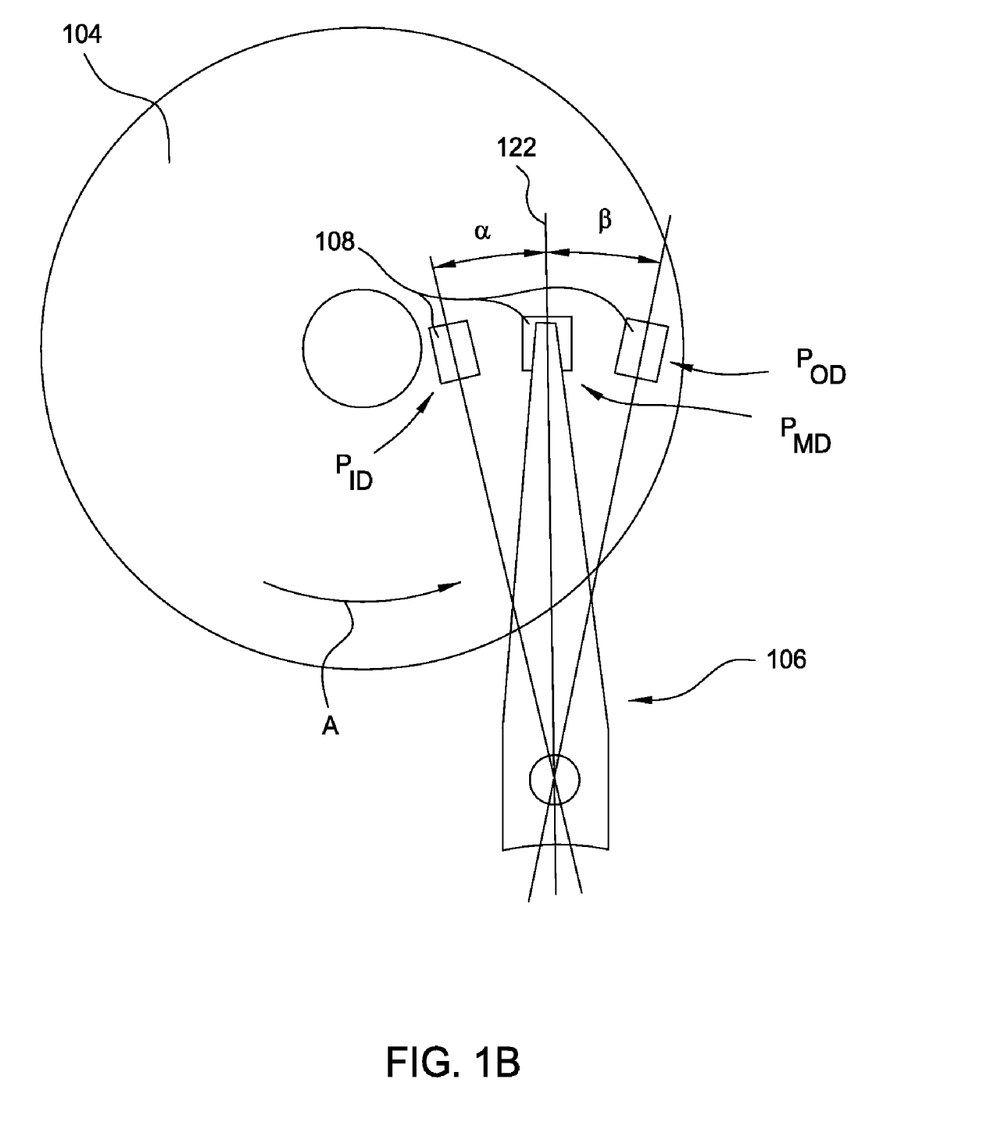
FIG. 1B is a schematic illustration showing the skew angles of the head slider at different positions with respect to a magnetic disk.

FIG. 1B is a diagram showing skew angles of the head slider 108 at different positions with respect to the magnetic disk 104. Actuator arm 106 supports the head slider 108 above the surface of the magnetic disk 104 at locations including an inner diameter (ID) position $P_{ID}$, an outer diameter (OD) position $P_{OD}$ and positions between $P_{ID}$ and $P_{OD}$. As the disk 104 spins, it produces airflow in a direction tangential to the disk in the direction the disk spins, as shown by arrow A. When the head slider 108 is at the mid-disk position $P_{MD}$, the centerline 122 of the head slider 108 is approximately aligned with the direction of the airflow produced by the disk 104, and the skew angle is therefore 0 (zero). When the head slider 108 is at other positions over the disk, however, the centerline 122 of the head slider 108 is not aligned with the direction of the airflow produced by the disk 104, and the angle of misalignment is known as the skew angle. As shown in FIG. 1B, when the head slider is at the ID position $P_{ID}$, the skew angle is α, which is the maximum skew angle in the ID direction, and when the head slider is at the OD position $P_{OD}$, the skew angle is β, which is the maximum skew angle in the OD direction. The skew angle affects the flying characteristics of the head slider ABS. Generally, the greater the skew angle, the lower the lift produced for a given airflow velocity. In addition, the airflow velocity produced by the spinning disk 104 is dependent on the distance from the center of the disk. At head slider fly heights, the tangential airflow produced by the disk is very close to the tangential velocity of the disk. This tangential velocity is equal to (RPM)×2πR, where RPM is the rotations per minute of the disk, and R is the distance from the head slider location to the center of the disk. In general these effects combine to produce a fly height profile wherein the head slider tends to fly higher at the mid-disk position $P_{MD}$ and decreases in both directions to minimum values at the ID position $P_{ID}$ and the OD position $P_{OD}$. This phenomenon is known as mid disk (MD) hump as described above.

Figure 1C:
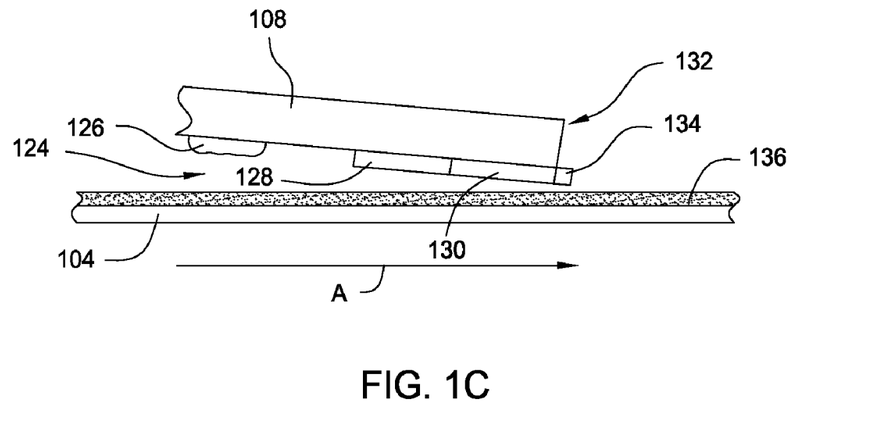
FIG. 1C is a side view of a head slider and magnetic disk.

FIG. 1C is a side view of the head slider 108 and the magnetic disk 104 of FIG. 1A. Magnetic disk 104 is moving in the direction of arrow A, (as also shown in FIG. 1B), and causes airflow in the same direction. This airflow flows over the air bearing surface (ABS) 124 of the head slider 108 and produces the lifting pressure described above. In one embodiment, head slider 108 includes raised areas such as front pad 126, side pads 128 and trailing pad 130. Trailing pad 130, located adjacent to and centered relative to, the trailing edge 132 of the head slider 108, may further include the read/write head 134 that writes and reads data to and from magnetic disk 104. Disk 104 has a lubricant 136 on its upper surface to protect the disk 104 from contact with the head slider 108.

Figure 2A:
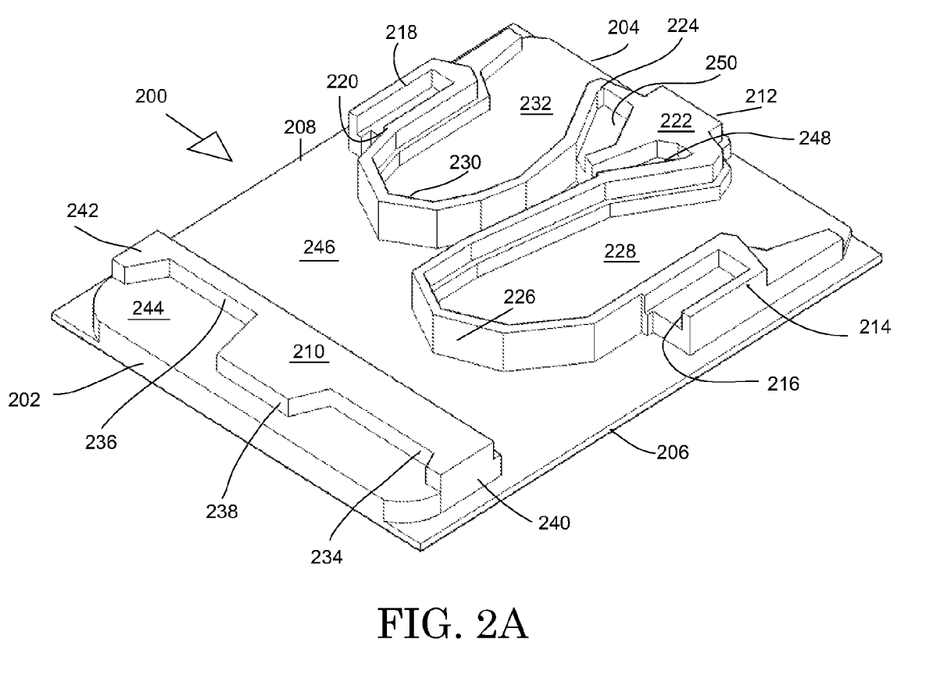
FIGS. 2A-2C are schematic views of a head slider according to one embodiment.
Figure 2B:
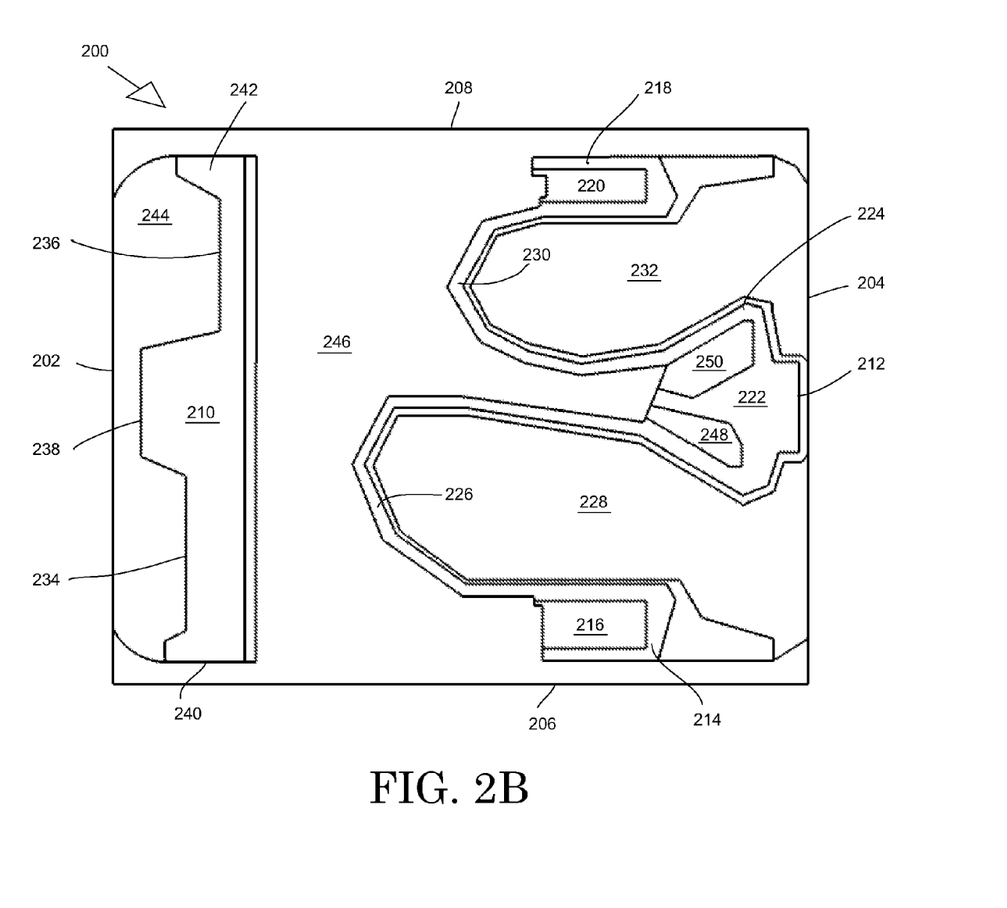
Figure 2C:
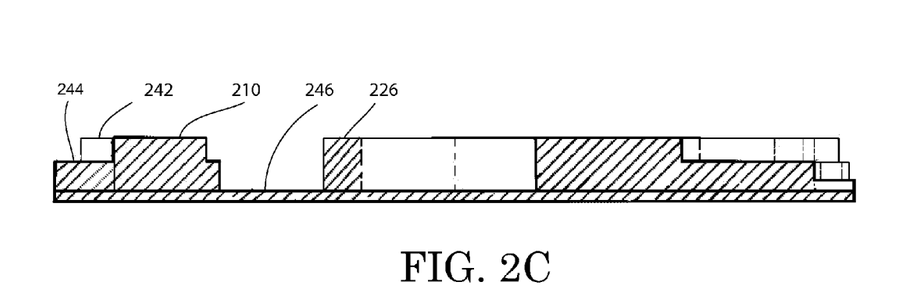

FIGS. 2A-2C are schematic views of a head slider 200 according to one embodiment. The head slider 200 needs to have servo write robustness at a low velocity in a helium environment. In one embodiment, the head slider 200 is used for servo writing in the helium environment while the hard disk is rotated at a speed of between about 4,000 RPM to about 10,000 RPM. During read operations, the head slider 200 will be operating in air while the hard disk rotates at between about 9,000 RPM to about 11,000 RPM. During servo writing, a head slider may lose its roll stiffness and become prone to lose clearance and contact or crash on the hard disk. To prevent crashing, the head slider 200 disclosed herein has a high roll stiffness in helium at low rotational speeds. In order to obtain the high roll stiffness, the U-shaped features or flanges are widened on one or both side rails for better pressurization. Additionally, the side walls extend near the end of the slider. In addition to being able to perform well during servo write conditions, the head slider 200 provides excellent altitude performance and low fly height sigma.

Embodiments of the present invention include reshaping/widening of the side U-shaped pockets on one or both sides of the side rails and reconfiguring the front and rear pad so that the altitude and fly height profile are kept within a predetermined target profile. Reshaping/widening and reconfiguring can provide added functionality with little performance cost.

The head slider 200 is a femto-sized slider with three different etch depths. The head slider 200 can be manufactured using standard fabrication techniques for head sliders. The U-shaped pockets on the sides pressurize during operation and are tailored specifically to provide high rolling stiffness while flying in helium at a low velocity. In general, the desire is for the sides of the ABS to be sufficiently stiff so that the tendency of the head slider 200 to roll is mitigated or eliminated if the suspension upon which the head slider 200 is mounted rotates.

The head slider 200 includes a head body having a leading edge 202, a trailing edge 204, an outside edge 206 and an inside edge 208. The ABS of the head slider 200 has a leading portion 210 that extends across the head slider 200 from the outside edge 206 to the inside edge 208. The leading portion 210 has a width that varies such that the portion 234 adjacent the outside edge 206 has a larger width than the portion 236 adjacent the inside edge 208. Additionally, the leading portion 210 has a head 238 and two flanges 242 that extend from the leading portion 210 towards the leading edge 202.

The head slider 200 also includes a tail portion 212. The tail portion 212 has an outside flange 214 that surrounds a first plateau 216. The tail portion 212 also has an inside flange 218 that surrounds a second plateau 220. The tail portion 212 also has a trailing portion 222 that is coupled between the outside flange 214 and the inside flange 218. A first wall 226 extends between a trailing pad 224 and the outside flange 214. A second wall 230 extends between the trailing pad 224 and the inside flange 218. The first wall 226 surrounds a third plateau 228 while the second wall 230 surrounds a fourth plateau 232. The trailing pad 224 encloses two plateaus 248, 250 that each have substantially the same depth as plateaus 216, 220.

The leading portion 210 and the tail portion 212 collectively comprise the ABS. Between the leading portion 210 and the leading edge 202 is a fifth plateau 244. The fifth plateau 244 is at substantially the same depth as the first plateau 216 and the second plateau 220. The first plateau 216, second plateau 220 and fifth plateau have a depth of between about 0.05 microns and about 0.5 microns, according to one embodiment. The leading portion 210 sweeps large particles away to prevent the particles from becoming trapped within the cavity 246. The cavity 246 is present between the leading portion 210 and the tail portion 212. The cavity 246 has a depth of between about 1.5 microns and about 3.1 microns, according to one embodiment. The cavity 246 separates the leading and tail portions so that they operate as independent air bearings. The cavity 246 has a narrow portion between the first wall 226 and the larger portion 234. The cavity 246 also has a wide portion between the second wall 230 and the thin portion 236.

While the hard disk is rotating, the head slider 200 flies above the surface of the hard disk. The further away from the center of the hard disk, the higher the linear speed of the hard disk. The revolutions per minute are the same for all points on the hard disk of course, but the tangential or linear speed of disk increases from the center to the edge of the hard disk. Thus, the outside edge 206 of the head slider 200 is adjacent a point on the hard disk that has a higher speed relative to a point on the hard disk adjacent the inside edge 208. The higher speed of the various points on the hard disk changes the air (or helium) flow during rotation. The higher speed increases the air (or helium) flow. Therefore, the head slider 200 may roll by increasing the distance between the ABS and the hard disk near the outside edge 206 while decreasing the distance between the ABS and the hard disk near the inside edge 208. In so doing, the head slider 200 could tilt or roll by an undesirable amount or even make contact and crash onto the hard disk. However, the design of the outside flange 214, plateau 216, and plateau 228 increases the stiffness of the head slider 200 and reduces the roll of the head slider 200, particularly when the slider 200 flies in helium at reduced rotational velocity.

Plateau 216 may have a width that is substantially equal to or greater than the width of plateau 220. Additionally, the surface area of plateau 216 may be substantially equal to or greater than the surface area of plateau 220. Because the plateau 216 has a surface area and width that is at least as large as the surface area and width of plateau 220, the stiffness of the head slider is increased and less likely to roll. In one embodiment, plateau 216 may have a width (i.e., distance parallel to the leading edge 202) of between about 20 microns and about 200 microns. Plateau 216 may have a length (i.e., distance parallel to the outside edge 206) of between about 50 microns and about 500 microns.

In addition to plateau 216, plateaus 228, 232 also affect the stiffness of the head slider 200. The head slider 200 is asymmetric such that plateau 228 has a greater surface area than plateau 232. In order for the surface areas of the plateaus 228, 232 to be different, wall 226 is longer than wall 230. In one embodiment, plateau 228 may have a width (i.e., distance parallel to the leading edge 202) at its widest point of between about 200 microns and about 400 microns. Plateau 228 may have a length (i.e., distance parallel to the outside edge 206) from the portion of wall 226 that is closes to the leading portion 210 and the portion of the flange 214 closest to the trailing edge 204 of between about 200 microns and about 600 microns. The width and length of plateau 232 may be anywhere from half the length and width of plateau 228 to equal to the width and length of plateau 228. Plateaus 228, 232 are at a depth of between about 0.5 microns and about 1.5 microns.

The head slider discussed herein is beneficial not only for read operations, but also servo write operations. During servo write operations, helium gas is used rather than air. Additionally, the hard disk is rotated at speeds that are significantly less than the rotational speeds during read operations. In one embodiment, the rotational speed during servo write operations may be about half of the rotational speed during product operation in air. During servo write operations, the helium flow is different than the air flow. The difference in flow is due to both the different viscosity and molecular mean free path of the gas and the rotational speed of the hard disk. During servo write operations, the head slider is more prone to roll and cause the inside edge of the head slider to come into contact with the hard disk. Therefore, it is beneficial to have a head slider that has sufficient stiffness not only in air, but also in helium. The stiffness obtained with the design discussed above is sufficient to permit the head slider to function during both servo write operations and product write and read operations without large tilt in the roll direction and avoiding crashing onto the hard disk. Because the stiffness of the head slider is increased, the fly height for the head slider over the hard disk may be predetermined and maintained during both servo write operations and product write and read operations.

Figure 3:
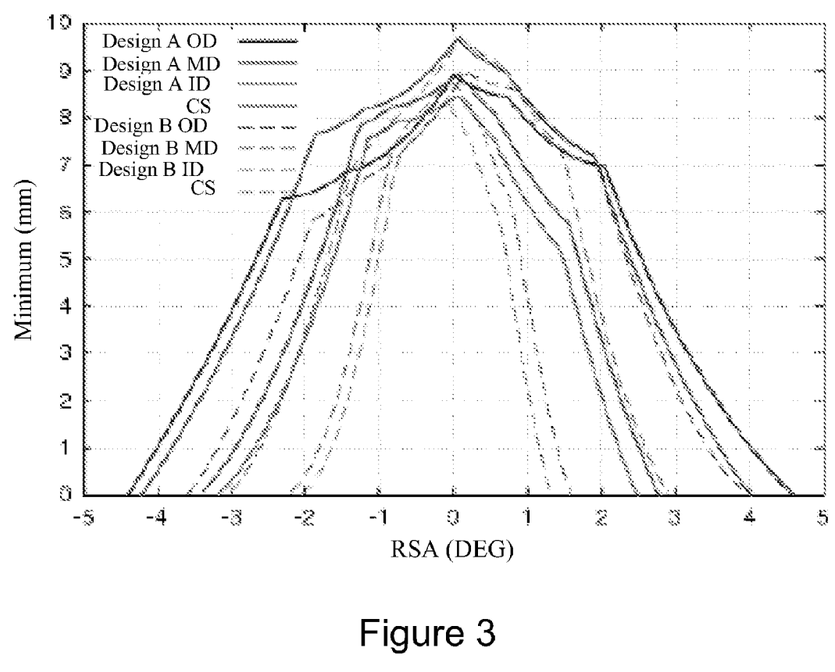
FIG. 3 is a graph showing the improved performance of a head slider when the suspension holding the head slider rotates.

FIG. 3 shows the roll stiffness of a head slider according to an embodiment of the present invention (labeled design A) compared to that of previous head sliders (labeled design B) when the gas fluid is helium and the operating disk velocity is lower than the product velocity. The horizontal axis shows the amount of roll tilt angle (RSA) produced by the flexure and is measured in degrees, while the vertical axis shows the minimum clearance between the slider and the disk measured in nanometers. Under high moment the head slider of the present invention, design A, loses less clearance. As shown in FIG. 3, there is a very wide range of RSA for the head slider of the present invention (labeled design A). In fact, the head slider design A exhibits very little roll even at high RSA tilt.

By designing a head slider that has a larger flange portion adjacent the outside edge of the head slider, the stiffness of the head slider may be increased. In addition to the stiffness increase, the likelihood of the head slider coming into contact with the rotating hard disk is decreased. In so doing, a head slider with a predetermined fly height may be maintained.

While the foregoing is directed to embodiments of the present invention, other and further embodiments of the invention may be devised without departing from the basic scope thereof, and the scope thereof is determined by the claims that follow.

What is claimed is:

1. A head slider for a hard disk drive, comprising:
a head body having a leading edge, a trailing edge, an outside edge, an inside edge, and an air bearing surface disposed on the head body, the air bearing surface having:
a leading portion extending across the leading edge between the outside edge and the inside edge; and
a tail portion spaced from the leading portion by a cavity that has a first depth relative to the air bearing surface, the tail portion having:
an outside flange surrounding a first plateau that is at a second depth that is less than the first depth, the first plateau having a first width;
an inside flange surrounding a second plateau that is at the second depth, the second plateau having a second width; and
a trailing portion coupled between the outside flange and the inside flange, the trailing portion having a trailing pad, a first wall extending between the trailing pad and the outside flange to surround a third plateau that is at a third depth that is greater than the second depth and less than the first depth, and a second wall extending between the trailing pad and the inside flange to surround a fourth plateau at the third depth.

2. The head slider of claim 1, wherein the first width is greater than the second width.

3. The head slider of claim 1, wherein the third plateau has a greater surface area than the fourth plateau.

4. The head slider of claim 1, wherein the cavity has a depth of between about 2.5 microns and about 3.1 microns.

5. The head slider of claim 1, wherein the leading portion has a width that varies between the inside edge and the outside edge.

6. The head slider of claim 1, wherein the first wall is shorter than the second wall.

7. The head slider of claim 1, wherein the leading edge has a fourth plateau at the second depth.

8. The head slider of claim 7, wherein the second depth is between about 0.05 microns and about 0.5 microns.

9. The head slider of claim 1, wherein the first plateau has a greater surface area than the second plateau.

10. The head slider of claim 1, wherein the trailing portion encloses a fifth plateau that is at the third depth.

11. A hard disk drive, comprising:
a magnetic disk having a surface, the magnetic disk, when rotating, creating an airflow in a direction substantially tangential to the magnetic disk; and
an actuator arm designed and configured to support a head slider over the disk surface at an inner diameter position, an outer diameter position, and positions between the inner diameter and outer diameter positions, the head slider comprising:
a head body having a leading edge, a trailing edge, an outside edge, an inside edge, and an air bearing surface disposed on the head body, the air bearing surface having:
a leading portion extending across the leading edge between the outside edge and the inside edge; and
a tail portion spaced from the leading portion by a cavity that has a first depth, the tail portion having:
an outside flange surrounding a first plateau that is at a second depth that is less than the first depth, the first plateau having a first width;
an inside flange surrounding a second plateau that is at the second depth, the second plateau having a second width; and
a trailing portion coupled between the outside flange and the inside flange, the trailing portion having a trailing pad, a first wall extending between the trailing pad and the outside flange to surround a third plateau that is at a third depth that is greater than the second depth and less than the first depth, and a second wall extending between the trailing pad and the inside flange to surround a fourth plateau at the third depth.

12. The hard disk drive of claim 11, wherein the first width is greater than the second width.

13. The hard disk drive of claim 11, wherein the third plateau has a greater surface area than the fourth plateau.

14. The hard disk drive of claim 11, wherein the cavity has a depth of between about 2.5 microns and about 3.1 microns.

15. The hard disk drive of claim 11, wherein the leading portion has a width that varies between the inside edge and the outside edge.

16. The hard disk drive of claim 11, wherein the first wall is shorter than the second wall.

17. The hard disk drive of claim 11, wherein the leading edge has a fourth plateau at the second depth.

18. The hard disk drive of claim 17, wherein the second depth is between about 0.05 microns and about 0.5 microns.

19. The hard disk drive of claim 11, wherein the first plateau has a greater surface area than the second plateau.

20. The hard disk drive of claim 11, wherein the trailing portion encloses a fifth plateau that is at the third depth.

* * * * *